US007076993B2

(12) United States Patent
Cook

(10) Patent No.: US 7,076,993 B2
(45) Date of Patent: Jul. 18, 2006

(54) LEAKAGE DETECTION METHOD FOR A PRESSURISED MEDICAL APPLIANCE

(75) Inventor: Gordon Cook, Hampshire (GB)

(73) Assignee: Novamedix Distribution Limited, Nicosia (CY)

( * ) Notice: Subject to any disclaimer, the term of this patent is extended or adjusted under 35 U.S.C. 154(b) by 0 days.

(21) Appl. No.: 10/311,280

(22) PCT Filed: Jun. 12, 2001

(86) PCT No.: PCT/GB01/02557

§ 371 (c)(1), (2), (4) Date: Feb. 14, 2003

(87) PCT Pub. No.: WO01/97747

PCT Pub. Date: Dec. 27, 2001

(65) Prior Publication Data

US 2003/0126912 A1 Jul. 10, 2003

(30) Foreign Application Priority Data

Jun. 17, 2000 (GB) .................................... 0014789

(51) Int. Cl.
*G01M 3/04* (2006.01)
*A61H 1/00* (2006.01)

(52) U.S. Cl. ........................................ 73/49.2; 601/149

(58) Field of Classification Search ................. 73/49.2; 606/202, 203; 601/149, 150
See application file for complete search history.

(56) References Cited

U.S. PATENT DOCUMENTS 3,885,554 A * 5/1975 Rockwell, Jr. .............. 601/150
4,205,551 A * 6/1980 Clifford et al. .............. 73/49.2
4,469,099 A * 9/1984 McEwen .................... 606/202
4,691,738 A * 9/1987 McCune ..................... 606/203
5,307,791 A * 5/1994 Senoue et al. ................. 601/9
5,935,146 A 8/1999 McEwen et al.
5,951,502 A 9/1999 Peeler et al.
6,051,016 A 4/2000 Mesaros et al.
6,475,228 B1 * 11/2002 Mesaros et al. ............ 606/202
6,605,103 B1 * 8/2003 Hovanes et al. ............ 606/202

FOREIGN PATENT DOCUMENTS

| | | | | | |
|---|---|---|---|---|---|
| EP | 6029 | A1 * | 12/1979 | ................ 73/49.2 |
| EP | 0 992 230 | A | 4/2000 | |
| GB | 2 270 472 | A | 3/1994 | |
| WO | WO 93/12708 | A | 7/1993 | |
| WO | WO 96/06569 | A | 3/1996 | |

* cited by examiner

*Primary Examiner*—Michael Cygan
(74) *Attorney, Agent, or Firm*—Birch, Stewart, Kolasch & Birch, LLP

(57) ABSTRACT

A method for detecting leakage in a pressurised medical appliance prior to normal operation, the system including an air compressor and an inflatable bag or bladder coupled to the air compressor through the intermediary of a fill valve allowing air to pass to the bladder and a vent valve for venting the system, the fill valve and the vent valve being selectively operable during said normal operation to deliver cyclical pulses of air to inflate and deflate the bladder, the detection method comprising a) opening the fill valve to vent the system to atmospheric pressure, b) closing the vent valve, c) pressurising the system by means of the air compressor to a pre-determined threshold value, d) monitoring the pressure gradient or rise over a period of time to said threshold value and e) comparing the pressure gradient over said period of time or at intervals of time within said period of time with a pre-specified pressure gradient indicative of system integrity whereby to determine the presence or otherwise of air leakage in the system.

8 Claims, 2 Drawing Sheets

LEAKAGE DETECTION METHOD FOR A PRESSURISED MEDICAL APPLIANCE

This application is the national phase under 35 U.S.C. 371 of PCT International Application No. PCT/GB01/02557 which has an International filing date of Jun. 12, 2001, which designated the United States of America.

FIELD OF THE INVENTION

The present invention relates to a medical appliance employing a fluid inflatable bag or bladder for applying cyclical pressure pulses to various parts of the human body thereby to enhance the circulation of blood and particularly to a method for determining the existence of fluid leakage in the appliance prior to normal operation.

BACKGROUND OF THE INVENTION

A medical appliance known as the A-V IMPULSE SYSTEM™ for applying a pumping pressure to various parts of the human body has gained wide popularity and acceptance in the medical field throughout the world in the treatment of certain medical conditions such as post-operative and post-traumatic pain and swelling and pre-operative and post-operative prophylaxis of deep vein thrombosis.

Its most common use is by application to the plantar arch of the human foot and to this end the device comprises an inflatable bladder, such as sold and marketed under the trade mark ImPad®, which in use is held in the plantar arch, the bladder being coupled to a control unit which is adapted to pump air under pressure to inflate and deflate the bladder cyclically thereby to apply a special pumping action to the plantar arch which assists in promoting venous blood flow return from the foot to the rest of the body.

The medical appliance as above described may be used and operated in a hospital environment under the supervision of trained staff or by patients themselves in a home environment.

If the hose connections between the bladder and the control unit of the A-V Impulse System™ are not fitted properly or if the bladder itself is defective due to the presence of holes or splits, then of course air will leak from the system and the full benefit of the therapeutic effects of the appliance will not be achieved.

Moreover incorrectly fitted hose connections between the control unit and the bladder cause the control unit at the beginning of a treatment process to emit pulses of air at high velocity which can startle a new, elderly or clinically unsupported patient especially when the device is being used in a home environment.

Consequently particularly in patient groups of this type acceptance of the product can be jeopardised and the benefits of treatment compromised.

SUMMARY OF THE INVENTION

It is an object of the present invention to modify the appliance of the prior art so that normal operation is not commenced until system integrity has been achieved that is before extraneous air leakage in the system connecting parts which couple the control unit to the bladder, or from a defective bladder, are eliminated.

According to one aspect of the invention there is provided a method for detecting leakage in a pressurised medical appliance prior to normal operation, the system including an air compressor and an inflatable bag or bladder coupled to the air compressor rough the intermediary of a fill valve allowing air to pass to the bladder and a vent valve for venting the system, the fill valve and the vent valve being selectively operable during said normal operation to deliver cyclical pulses of air to inflate and deflate the bladder, the detection method comprising opening the fill valve to vent the system to atmospheric pressure, closing the vent valve, pressurising the system by means of the air compressor to a pre-determined threshold value, monitoring the pressure gradient over a period of time to said threshold value and comparing the pressure gradient over said period of time or at intervals of time within said period of time with a pre-specified pressure gradient indicative of system integrity whereby to determine the presence or otherwise of air leakage in the system.

Preferably the pre-specified pressure gradient is based upon achieving a system pressure of 10 mmHg within 3 seconds of energisation of said air compressor.

Advantageously the method of control is by means of a computer programmed to operate the air compressor and the fill and vent valves as required.

According to another aspect of the invention there is provided inflation apparatus for medical use comprising an air compressor and an inflatable bladder coupled to the air compressor, a fill valve for allowing air to pass to the bladder, a vent valve for venting the system, the fill and vent valves being selectively operable to deliver cyclical pulses of pressurised air from the compressor periodically to inflate the bladder during normal operation, and means for selective operation of the fill valve and the vent valve whereby to detect for air leakage prior to said normal operation, in the following manner: opening the fill valve to vent the system to atmospheric pressure, closing the vent valve, pressurising the system by means of the air compressor to a pre-determined threshold value, monitoring the pressure gradient or rise over a period of time to said threshold value and comparing the pressure gradient over said period of time or at intervals of time within said period of time with a pre-specified pressure gradient indicative of system integrity whereby to determine the presence or otherwise of air leakage in the system

BRIEF DESCRIPTION OF THE DRAWINGS

The invention will now be described by way of example with reference to the accompanying drawings wherein.

PREFERRED EMBODIMENTS OF THE INVENTION

Figure 1:
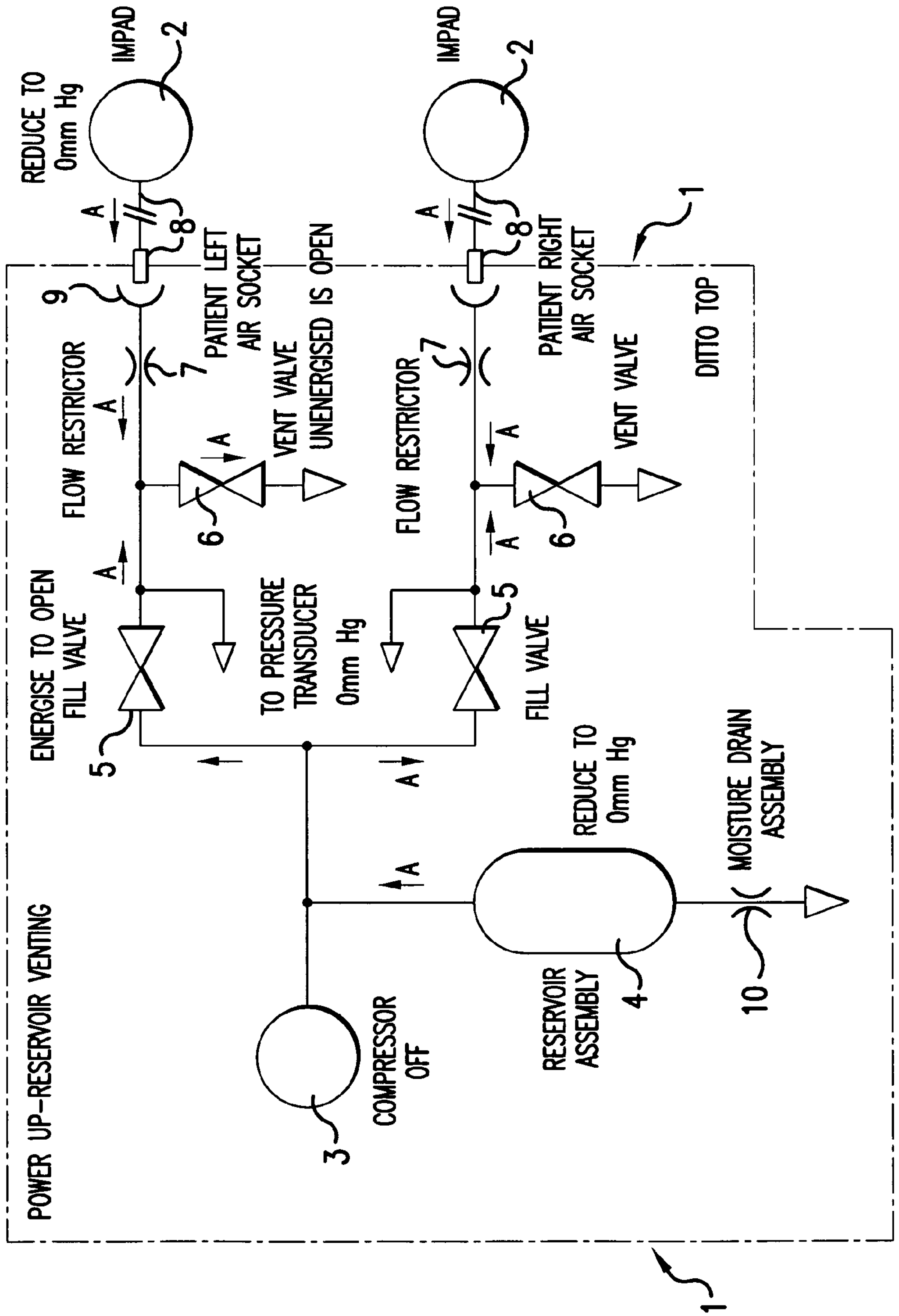
FIG. 1 is a schematic diagram of a medical appliance comprising a pressurised air supply control unit coupled in use to two inflatable bladders for applying cyclical pressure to a part of the human body and illustrating the initial stage of performing the detection method according to the present invention.
Figure 2:
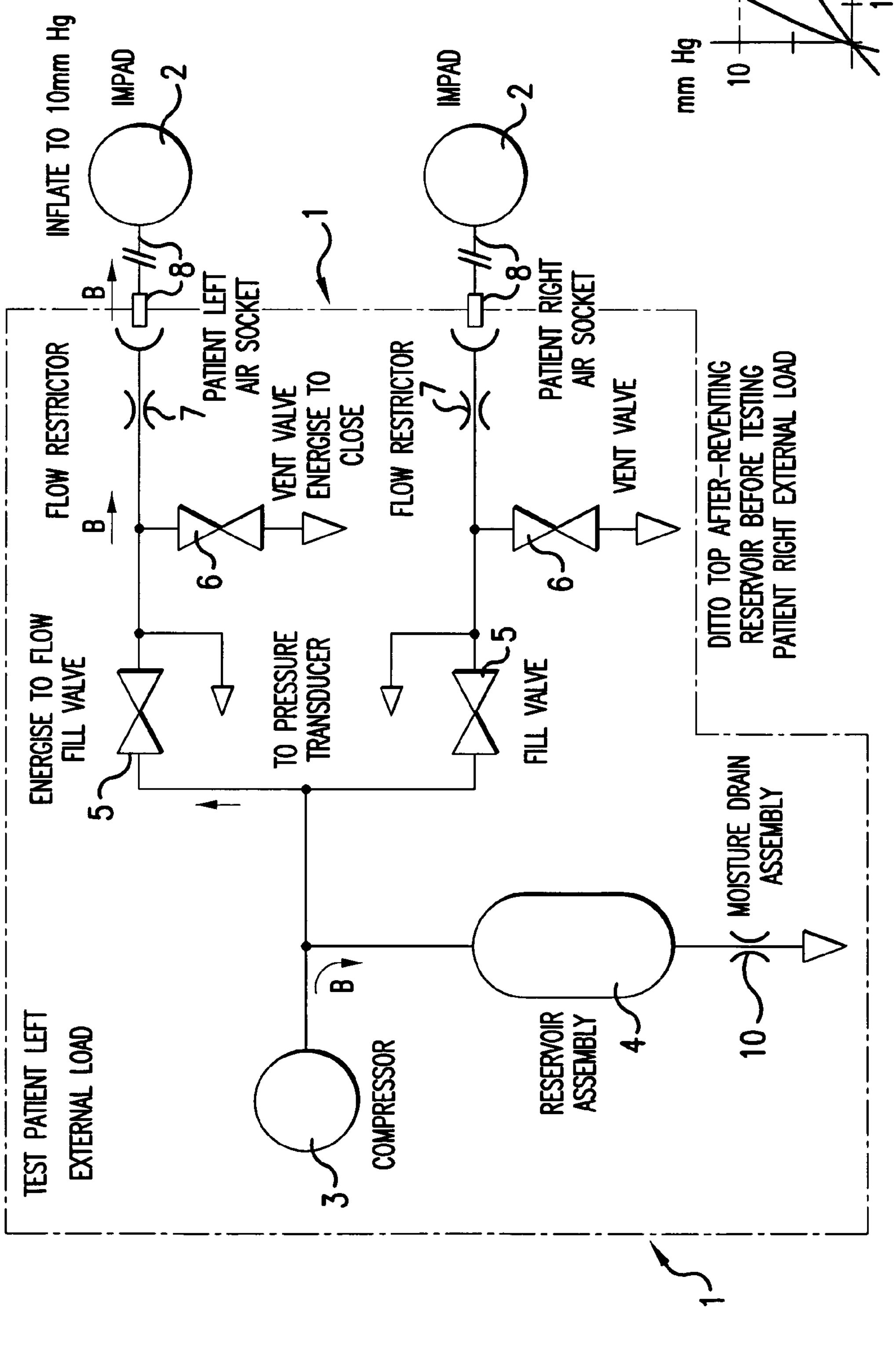
FIG. 2 is a schematic diagram identical to that shown in FIG. 1 but illustrating the operation of the air supply control in accordance with the final stage of the detection method in accordance with the invention and FIG. 2A is a graph illustrating preferred detection parameters in accordance with the method of the invention.

With reference to the drawings FIGS. 1 and 2 illustrate in schematic form the essential components of the medical appliance herein before referred to as the A-V IMPULSE SYSTEM™, for applying a pumping action to the body to enhance blood circulation through the intermediary of an inflatable bag or bladder.

The appliance comprises a control unit 1 coupled to at least one inflatable bag or bladder 2. In the illustration shown in the drawings the appliance is set up for use to inflate two bladders 2 for positioning respectively in the plantar arches of the feet of the human body and held in that position by a specially designed sling or foot slipper (not shown).

The control unit 1 comprises an air compressor 3, a storage reservoir 4 for compressed air and a fill valve 5 leading to each inflatable bladder 2 from the reservoir 4.

A vent valve 6 is positioned between each fill valve 5 and Its associated bladder 2 with a flow restrictor 7 for controlling the flow of pressurised air immediately in advance of each inflatable bladder 2.

In use the patient, or attendant medical personnel, couples the control unit 1 to the bladders 2 when installed on the feet by hose connections 8 which fit into air sockets 9 provided on the housing (not shown) of the control unit 1, and the tube or connector (not shown) of the bladders 2.

In normal operation the compressor 3 is set to run continuously to charge the reservoir 4. Water condensate from compression of the air is discharged from the moisture drain assembly 9 in communication with the reservoir 4.

Air is not allowed to pass the fill valves 5 which remain normally closed. The bladders 2 are vented to atmospheric pressure through the vent valves 6 which are normally open.

The rapid impulse inflation pressure hold and venting are controlled by actuation of the fill and vent valves 5,6 during which the pressure in the reservoir 4 is fluctuating but always at greater than atmospheric pressure.

As referred to earlier in this disclosure unless the pressurised system is free of extraneous leaks, pulses of high velocity air flow from the air outlet sockets 9 or hose connection 8 of the control unit 1 which can cause distress to the patient using the appliance.

This problem has been dealt with in accordance with the present invention by an arrangement which does not allow the control unit 1 to operate at normal conditions while extraneous leaks are present in the system so that instead of charging the reservoir 4 to full operating pressure at the commencement of a medical treatment the system is first vented to atmosphere and then pressurised over a pre-determined period of time to a pre-determined threshold value to test for leakage and before pulses of pressurised air are delivered to the bladders 2.

Thus in this initial stage which may be termed an air leakage check stage, all residual pressure within the reservoir 4, internal tubing, fill and vent valves, 5,6 air hoses 8 or the inflatable bladder 2 is vented to atmospheric pressure by activating the fill valves 5 to open whilst leaving the vent valves 6 inactivated and therefore also in the open position, this taking place when the control unit 1 is turned on but before the air compressor 3 is started. This is illustrated by directional arrows A in FIG. 1.

When the system has been sufficiently vented the vent valves 6 are activated to prevent air escaping from the system and with the fill valves 5 activated and therefore in the open position the compressor 3 is energised to raise the system pressure from atmospheric. This is illustrated by directional arrows B in FIG. 2.

The system pressure is monitored as it rises from zero until threshold points are reached which are indicative or otherwise of system integrity.

Figure 2A:
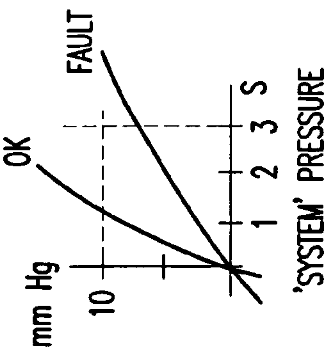

In a preferred aspect of the method in accordance with the invention system integrity is considered to be achieved if a system pressure of 10 mmHg is attained within three seconds from energisation of the compressor 3, see FIG. 2A.

The pressure gradient may also be monitored and measured at various points whereby to determine the presence or otherwise of extraneous air leakage in the system.

The medical appliance shown in the drawings is a two channel system and with the method according to the invention both left and right sides may be checked sequentially for air leakage while ensuring that pressure is returned to atmospheric after testing one channel and before testing the other.

This does not preclude of course the possibility of testing both channels together but in practice this is less preferable.

Provided that the pressure limits are achieved within the permissible period the control unit 1 is allowed to continue to charge the reservoir 4 to normal working pressure by deactivating the fill valve 5 to close and deactivating the vent valve 6 to open and once normal conditions are attained impulse pressure is applied to the bladders 2.

Should the pressure limits not be achieved an alarm, not shown, is activated to warn the user who is then able to check the connections between the control unit and the bladder 2 and the integrity of the bladders 2.

As mentioned above a principal advantage of the method according to the invention is that should there be air leakage such will occur at relatively low pressure and at a steady rather than a pulsed state.

Apart from patient alarm which may be caused by pulses of leaking air at high velocity, the method according to the invention avoids unnecessary delay and promotes confidence in the set up of the device before actual treatment commences.

The normal detection method as described above is achieved without changing the basic structure of the appliance and may be controlled by a mini computer device installed in the appliance and programmed to operate the existing air valves 5,6 in an initial check stage which differs from the later selective operation of the air valves 5,6 during normal operation whereby to achieve pulsed air flow.

The invention claimed is:

1. A method for detecting leakage in a pressurized medical appliance prior to normal operation, the system including an air compressor and an inflatable bag or bladder coupled to the air compressor through the intermediary of a fill valve allowing air to pass to the bladder and a vent valve for venting the system, the fill valve and the vent valve being selectively operable during said normal operation to deliver cyclical pulses of air to inflate and deflate the bladder, the detection method comprising;

a) opening the fill valve to vent the system to atmospheric pressure, b) closing the vent valve, c) pressurizing the system by means of the air compressor to a predetermined threshold value, d) monitoring the pressure gradient or rise over a period of time to said threshold value, and e) comparing the pressure gradient over said period of time or at intervals of time within said period of time with a pre-specified pressure gradient indicative of system integrity based upon achieving a system pressure of 10 mmHg within 3 seconds of energization of said air compressor whereby to determine the presence or otherwise of air leakage in the system.

2. A method as claimed in claim 1, including computer programmable means for performing steps (a) through (e).

3. The method of claim 1, further comprising:

monitoring and measuring the pressure gradient at various points in the system.

4. The method of claim 1, further comprising:

activating an alarm should system pressure limits not be achieved.

5. The method of claim 1, wherein the system is pressurized at a steady state.

6. The method of claim 1, further comprising performing each recited step in claim 1 prior to normal operation of the pressurized medical appliance.

7. Inflation apparatus for medical use comprising an air compressor and an inflatable bladder coupled to the air compressor, a fill valve for allowing air to pass to the bladder, a vent valve for venting the system, the fill and vent valves being selectively operable to deliver cyclical pulses of pressurized air from the compressor periodically to inflate the bladder during normal operation, and means for selective operation of the fill valve and the vent valve whereby to detect for air leakage prior to said normal operation, comprising:

a) means for opening the fill valve to vent the system to atmospheric pressure, b) means for closing the vent valve, c) means for pressurizing the system by means of the air compressor to a predetermined threshold value, d) means for monitoring the pressure gradient or rise over a period of time to said threshold value, and e) means for comparing the pressure gradient over said period of time or at intervals of time with a pre-specified pressure gradient indicative of system integrity based upon achieving a system pressure of 10 mmHg within 3 seconds of energization of said compressor whereby to determine the presence or otherwise of air leakage in the system.

8. Inflation apparatus as claimed in claim 7 wherein said means for selective operation of the fill valve and vent valve includes computer programmable means.

* * * * *